(12) United States Patent
Huang et al.

(10) Patent No.: US 8,953,050 B2
(45) Date of Patent: Feb. 10, 2015

(54) INTERACTION WITH ELECTRONIC DEVICE RECOGNIZED IN A SCENE CAPTURED BY MOBILE DEVICE

(71) Applicant: Quanta Computer Inc., Kuei Shan Hsiang, Tao Yuan Shien (TW)

(72) Inventors: Ting-Han Huang, Tao Yuan Shien (TW); Kang-Wen Lin, Tao Yuan Shien (TW); Yu-Chen Huang, Tao Yuan Shien (TW); Chia-Yi Wu, Tao Yuan Shien (TW); Juin-Yi Huang, Tao Yuan Shien (TW); Shin-Hau Huang, Tao Yuan Shien (TW); Po-Chih Tsai, Tao Yuan Shien (TW); Ching-Fan Chu, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 79 days.

(21) Appl. No.: 13/686,428

(22) Filed: Nov. 27, 2012

(65) Prior Publication Data
US 2014/0022397 A1   Jan. 23, 2014

(30) Foreign Application Priority Data
Jul. 17, 2012   (TW) .............................. 101125667 A (51) Int. Cl.
*H04N 5/225* (2006.01)
*H04N 5/232* (2006.01)
*G06F 3/00* (2006.01)

(52) U.S. Cl.
CPC ........... *H04N 5/225* (2013.01); *H04N 5/23206* (2013.01)

USPC ................... 348/207.1; 348/211.99; 715/740

(58) Field of Classification Search
CPC   H04N 5/232; H04N 5/23203; H04N 5/23206
USPC ........ 348/207.1, 211.99, 211.1, 211.2, 211.3; 725/105
See application file for complete search history.

(56) References Cited

U.S. PATENT DOCUMENTS

| | | | | |
|---|---|---|---|---|
| 6,037,936 | A * | 3/2000 | Ellenby et al. | 715/764 |
| 6,977,672 | B1 * | 12/2005 | Okuno | 348/207.11 |
| 7,940,986 | B2 * | 5/2011 | Mekenkamp et al. | 382/181 |
| 8,218,874 | B2 * | 7/2012 | Boncyk et al. | 382/181 |
| 8,315,673 | B2 * | 11/2012 | Gum | 455/566 |
| 8,405,729 | B2 * | 3/2013 | Jain | 348/207.1 |
| 8,537,231 | B2 * | 9/2013 | Mekenkamp et al. | 348/222.1 |
| 8,633,960 | B2 * | 1/2014 | Thorne et al. | 348/14.02 |
| 2002/0090132 | A1 * | 7/2002 | Boncyk et al. | 382/154 |
| 2004/0208372 | A1 * | 10/2004 | Boncyk et al. | 382/181 |
| 2006/0135064 | A1 * | 6/2006 | Cho et al. | 455/41.1 |
| 2006/0161379 | A1 * | 7/2006 | Ellenby et al. | 702/150 |
| 2007/0279521 | A1 * | 12/2007 | Cohen | 348/376 |
| 2010/0163613 | A1 * | 7/2010 | Bucher et al. | 235/375 |
| 2011/0016405 | A1 * | 1/2011 | Grob et al. | 715/740 |
| 2011/0066745 | A1 * | 3/2011 | Olsson et al. | 709/231 |
| 2011/0081860 | A1 * | 4/2011 | Brown et al. | 455/41.3 |
| 2011/0169947 | A1 * | 7/2011 | Gum et al. | 348/135 |
| 2011/0295502 | A1 * | 12/2011 | Faenger | 701/211 |

(Continued)

*Primary Examiner* — John Villecco
(74) *Attorney, Agent, or Firm* — McClure, Qualey & Rodack, LLP (57) ABSTRACT

An interaction system is provided. The interaction system has a first mobile device, configured to capture images of a scene, and a server, configured to recognize a first electronic device from the images captured by the first mobile device, so that the first electronic device and the first mobile device interact with each other.

2 Claims, 7 Drawing Sheets

(56) References Cited

U.S. PATENT DOCUMENTS

| | | | |
|---|---|---|---|
| 2012/0242840 A1* | 9/2012 | Nakfour et al. | 348/207.1 |
| 2013/0083207 A1* | 4/2013 | Boncyk et al. | 348/207.1 |
| 2013/0203448 A1* | 8/2013 | Kang et al. | 455/457 |
| 2013/0229536 A1* | 9/2013 | Boncyk et al. | 348/207.1 |
| 2013/0265400 A1* | 10/2013 | Boncyk et al. | 348/62 |
| 2013/0265435 A1* | 10/2013 | Boncyk et al. | 348/158 |
| 2014/0003656 A1* | 1/2014 | Lin | 382/103 |

\* cited by examiner

INTERACTION WITH ELECTRONIC DEVICE RECOGNIZED IN A SCENE CAPTURED BY MOBILE DEVICE

CROSS REFERENCE TO RELATED APPLICATIONS

This Application claims priority of Taiwan Patent Application No. 101125667, filed on Jul. 17, 2012, the entirety of which is incorporated by reference herein.

BACKGROUND OF THE INVENTION

1. Field of the Invention

The present invention relates to an interaction system, and in particular relates to an interaction system capable of interacting with an electronic device captured by a mobile device.

2. Description of the Related Art

With the advent of different technologies, mobile devices (e.g. smart phones and tablet PCs) have become more and more popular. Generally, image capturing devices are deployed in mobile devices for capturing video or images. However, the captured video or images may merely be uploaded to a server from the mobile devices, for other users to download the uploaded video or images for interaction. Specifically, the mobile devices cannot efficiently use the image capturing device disposed therein to perform interaction. That is, the mobile devices can not control the electronic devices of other users to perform interaction via recognition of the electronic devices from the captured images.

BRIEF SUMMARY OF THE INVENTION

A detailed description is given in the following embodiments with reference to the accompanying drawings.

In an exemplary embodiment, an interaction system is provided. The interaction system has a first mobile device, configured to capture images of a scene; and a server, configured to recognize a first electronic device from the images captured by the first mobile device, so that the first electronic device and the first mobile device interact with each other.

In another exemplary embodiment, an interaction system is provided. The interaction system comprises a first electronic device configured to capture a first video stream and transmit the first video stream to a server, wherein the first video stream comprises a second electronic device capturing a second video stream. The first electronic device receives the second video stream from the server in response to a user selecting the second electronic device in the first video stream.

In yet another embodiment, an interaction system is provided. The interaction system comprises a server configured to receive a first video stream captured by a first electronic device and a second video stream captured by a second electronic device, wherein the first video stream comprises the second electronic device. The server further recognizes the second electronic device in the first video stream and transmits the second video stream to the first electronic device in response to a first user selecting the second electronic device in the first video stream.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
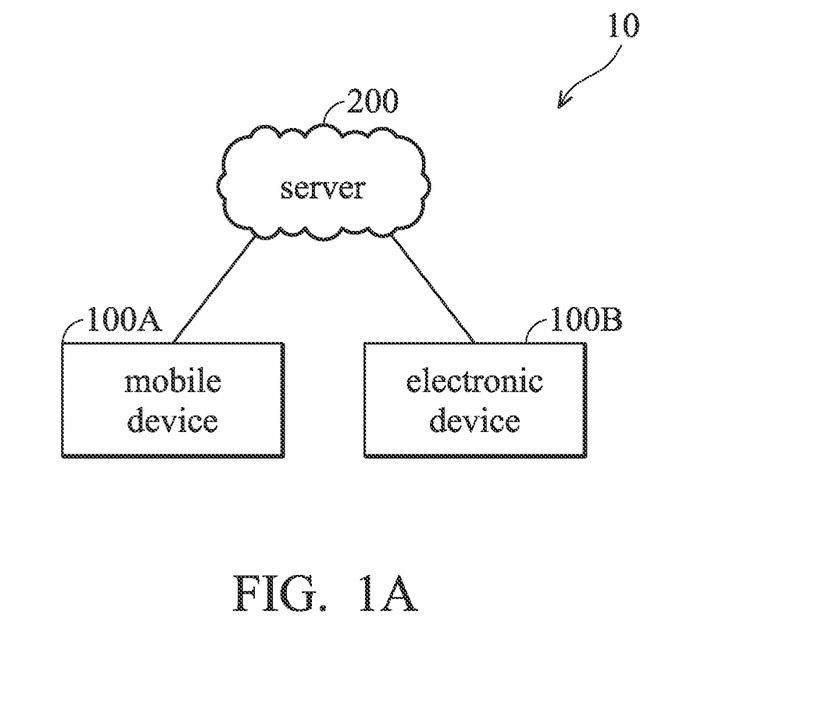
FIG. 1A illustrates a block diagram of an interaction system 10 according to an embodiment of the invention.

FIG. 1A illustrates a block diagram of an interaction system 10 according to an embodiment of the invention. In an embodiment, the interaction system 10 at least comprises a mobile device 100A, an electronic device 100B and a server 200. In an embodiment, the mobile device 100A and the electronic device 100B are connected to the server 200 for performing interaction through a wired network or a wireless network, respectively. In an embodiment, the electronic device 100B can be a mobile device, a display device, or an image capturing device, and each electronic device can interact with each other in a variety of ways. Specifically, when the mobile device 100A and the electronic device 100B are located in the same area (for example, the geographical locations of the two devices are very close) and the scene captured by the mobile device 100A of a user A comprises the electronic device 100B of the user B, the server 200 may recognize the electronic device 100B from the images of the scene captured by the mobile device 100A. Further, user A may select or touch the electronic device 100B or images of user B from the images captured by the mobile device 100A, and then view the images captured by the electronic device 100B on the mobile device 100A.

Figure 1B:
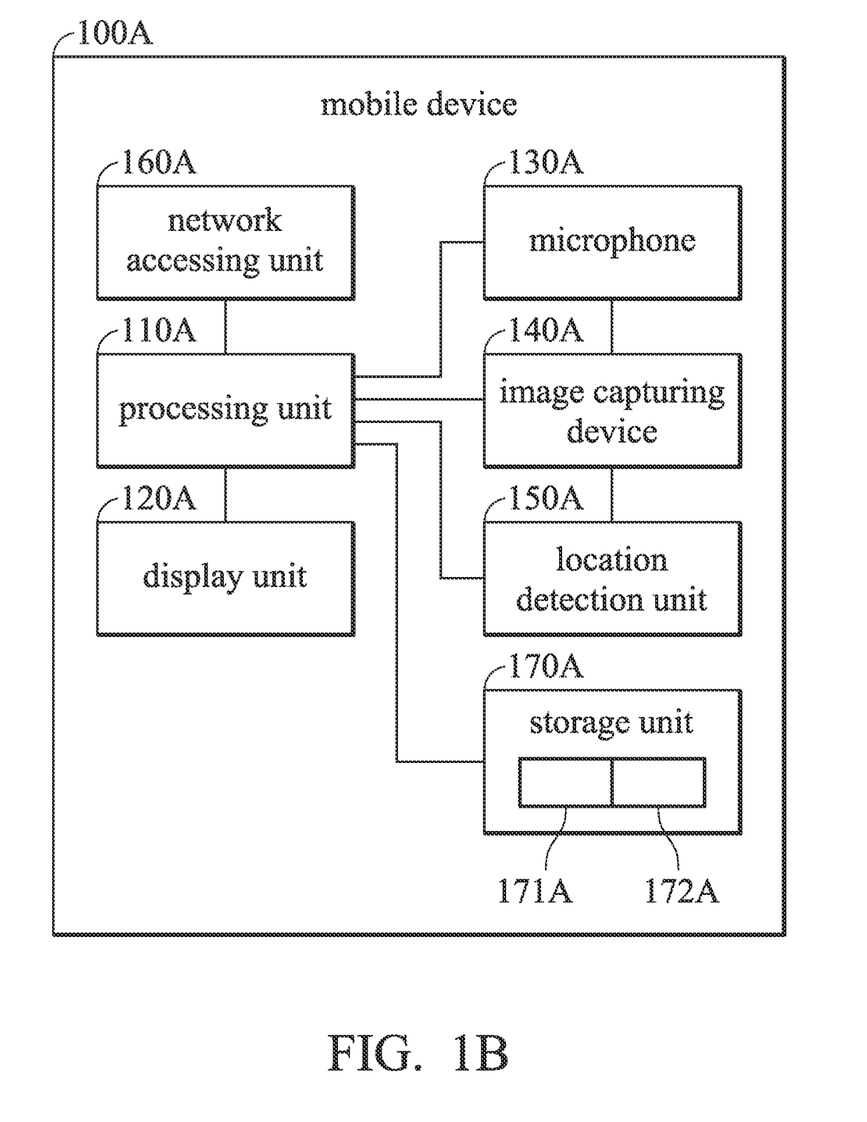
FIG. 1B illustrates a simplified block diagram of the mobile device 100A according to an embodiment of the invention.

FIG. 1B illustrates a simplified block diagram of the mobile device 100A according to an embodiment of the invention. As illustrated in FIG. 1B, the mobile device 100A at least comprises a processing unit 110A, a display unit 120A, a microphone 130A, an image capturing device 140A, a location detection unit 150A, a network accessing unit 160A, and a storage unit 170A. The processing unit 110A is configured to process various instructions and actions of the mobile device 100A. The microphone 130A and the image capturing device 140A (e.g. a camera) are configured to capture sounds and images, respectively. The location detection unit 150A may be a global positioning system (GPS), an assisted global positioning system (AGPS), a radio frequency (RF) triangulation device, an electronic compass, or an inertial measurement unit (IMU), but the invention is not limited thereto. The mobile device 100A is connected to the server 200 via the network accessing unit 160A. The network accessing unit 160A can be a wired/wireless network interface, such as a TCP/IP wired network interface, a Wifi interface, a 3G/4G network interface, or a 802.11x interface, but the invention is not limited thereto. The storage unit 170A is configured to store an operating system (e.g. Android, iOS, or Windows 8 operating system) 171A and an interaction application 172A for executing the interaction method of the invention.

In an embodiment, the mobile device 100A may be a smart phone, a tablet PC, or a laptop. The electronic device 100B may be devices within the coverage of the mobile device 100A, and may also be a fixed electronic device, such as a TV or a projector. Given that the electronic device 100B is a mobile device, the components of the electronic device 100B correspond to those of the mobile device 100A, so the details will not be described here.

Figure 1C:
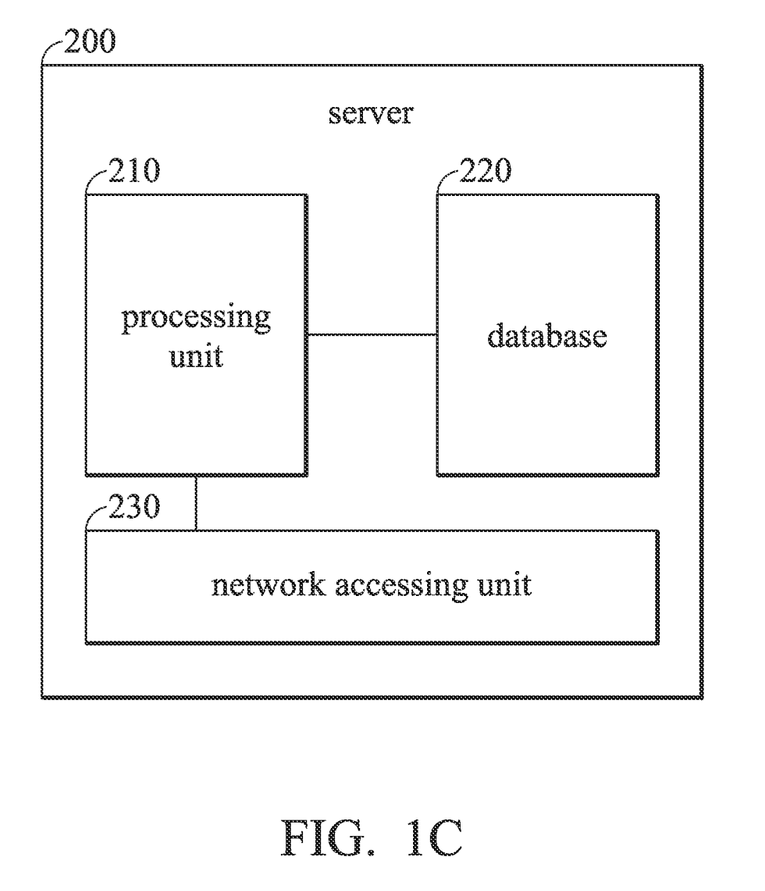
FIG. 1C illustrates a simplified block diagram of the server 200 according to an embodiment of the invention.

FIG. 1C illustrates a simplified block diagram of the server 200 according to an embodiment of the invention. The server 200 at least comprises a processing unit 210, a database 220, and a network accessing unit 230. The processing unit 210 is configured to process various instructions, synchronization and recognition actions of the server 200, and connect to the mobile device 100A or the electronic device 100B via the network accessing unit 230. The database 220 may comprise registration data of a plurality of users, face data (e.g. face photos or characteristics of faces), and/or social network data, mobile devices or electronic devices owned by each registered user, and recognition data of other recognizable mobile devices or electronic devices. For example, the user A may register personal data (e.g. name, email, phone number, and photos), social network data (e.g. Google+ or Facebook) and the mobile device 100A of the user A onto the server 200. The information of the aforementioned recognizable mobile device may comprise the device name, the type (e.g. a smart phone), functions (e.g. internet accessing, phone dialing, recording sounds, recording videos, and displaying images), appearance photos (e.g. commercial photos), the brand, the model number, or the bar code of the mobile device 100A. If the mobile device 100A connects to the server 200 for uploading captured images after registration, the metadata such as the geographical location, the status information (e.g. the turning on/off status of the mobile device, the microphone or the camera), the uploading time, and the recording time can be transmitted to the server 200 together. The status information of the mobile device 100A can be determined by whether the mobile device 100 is connected to the server 200. In another example, the manufacturer or the user B may register corresponding information of the fixed electronic device 100B on the server 200. Specifically, the electronic device 100B can be a TV located in the living room, and the user B may register recognition data such the name of the geographical location (e.g. the GPS coordinate of the living room) of the TV, the type (e.g. TV), functions (e.g. displaying sounds and images), appearance photos, the brand, the model number, and/or the bar codes. For those skilled in the art, it is appreciated that the mobile device 100A and the server 200 in FIGS. 1B and 1C are illustrated simplified block diagrams for ease of description, but the invention is not limited thereto. In addition, it is noted that the aforementioned recognition data can be regarded as a portion of the metadata. The recognition data is distinguished from the metadata with ease of explanation. The recognition data may indicate the data written by the user during registration, and the metadata may indicate the uploaded data when the mobile device is connected to the server 200. Accordingly, the recognition data and the metadata can be information used to recognize mobile devices or electronic devices.

Figure 2A:
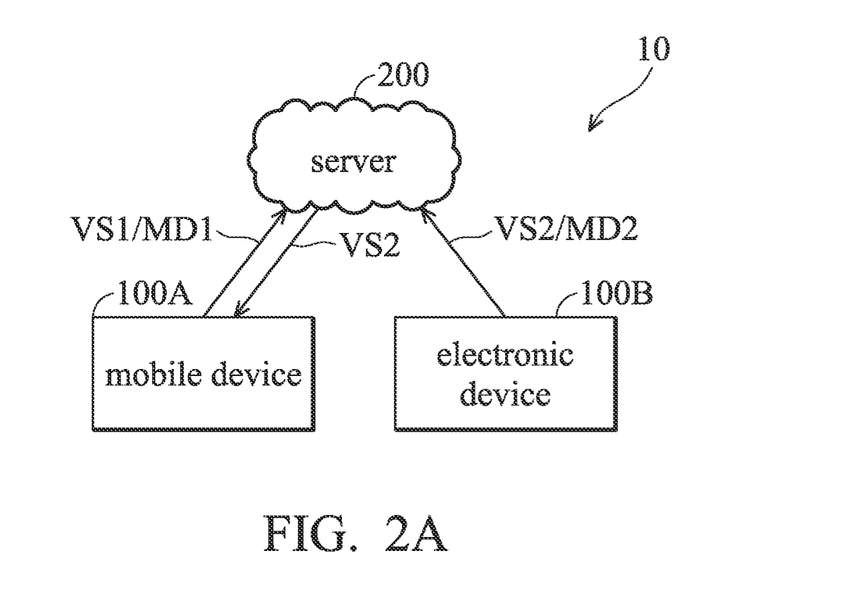
FIGS. 2A to 2C illustrate diagrams of ways of interaction performed on the interaction system according to different embodiments of the invention.
Figure 2B:
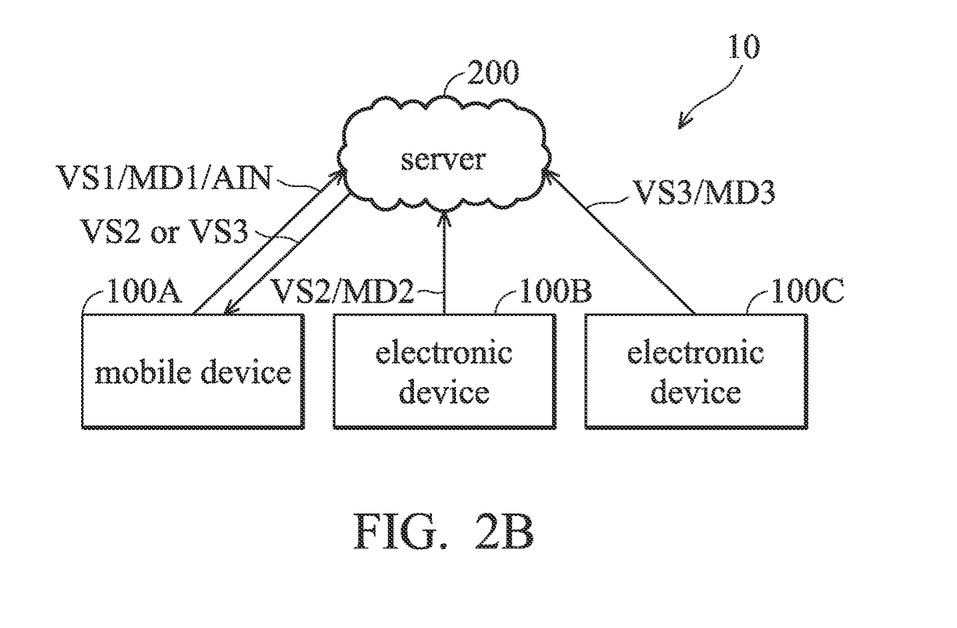
Figure 2C:
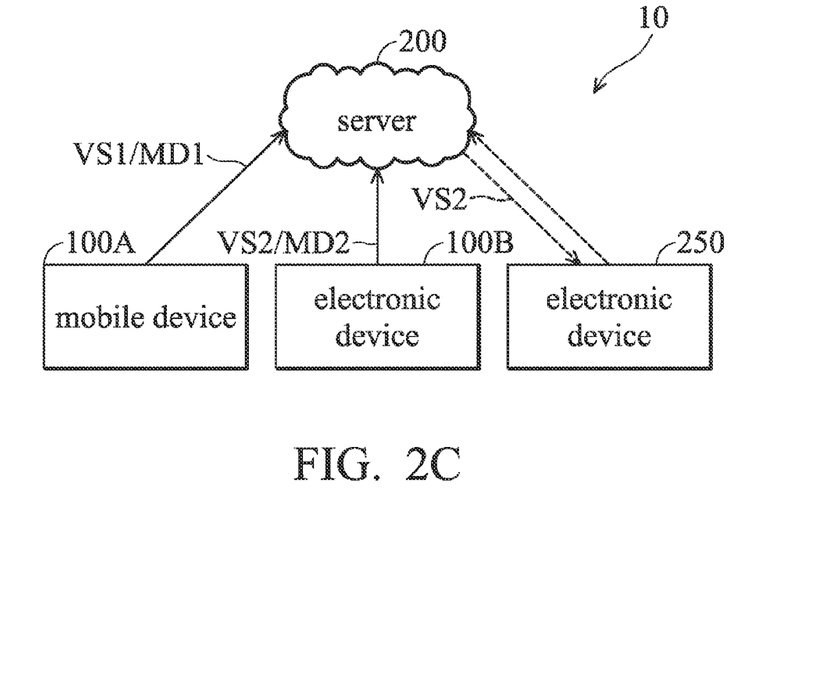

FIGS. 2A to 2C illustrate diagrams of ways of interaction performed on the interaction system according to different embodiments of the invention. As illustrated in FIG. 2A, the user B may capture scene images via the electronic device 100B, and the user A may capture images of the user B via the mobile device 100A. In other words, the mobile device 100A may capture images of user B and the electronic device 100B thereof. The mobile device 100A and the electronic device 100B may generate video streams (or videos) VS1 and VS2 and continuously upload the generated video streams (or videos) VS1 and VS2 to the server 200, respectively. During the uploading process, the mobile device 100A and the electronic device 100B may transmit the corresponding metadata MD1 and MD2 to the server 200, respectively. For example, the metadata MD1 (or MD2) may comprise the mobile device uploading the video stream VS1, the uploading time, the geographical location upon capturing images, and the length/format/size of the video stream VS1. Meanwhile, the user A may select the captured user B or the electronic device 100B on the mobile device 100A, thereby transmitting a viewing request signal to the server 200. Specifically, if the user A selects the user B on the mobile device 100A, the server may use a face recognition technique to recognize the user B from the video stream VS1 from the mobile device 100A since the server 200 has the photos of the user B. In addition, since it is indicated that the electronic device 100B is owned by the user B in the registration data, the server 200 may know that the video stream VS2 is being provided by the electronic device 100B from the registration data and the metadata provided thereto, thereby transmitting the video stream VS2 to the mobile device 100A. Accordingly, the user A may view the images captured by the electronic device 100B of the user B on the mobile device 100A.

In an embodiment, if the user A selects the electronic device 100B on the mobile device 100A, the server may recognize the selected electronic device (e.g. recognize that the selected electronic device is the electronic device 100B or other registered electronic device) by image recognition techniques, text recognition techniques or bar codes since the user B has registered the recognition data such as the type, the brand, the bar codes, appearance photos of the electronic device 100B on the server 200. Specifically, the server 200 may determine whether the electronic device in the images is the electronic device 100B by matching the type, the brand, the bar codes, and the appearance photos in the images with the registered recognition data (e.g. the registered type, brand, bar codes, and appearance photos) of the electronic device 100B.

In the embodiment, as illustrated in FIG. 2B, the user B further owns an electronic device 100C (e.g. a mobile device) and has registered the electronic device 100C on the server 200. If the user A wants to view images captured by one of the electronic devices of the user B by selecting an image of the user B on the mobile device A, the server 200 must determine which electronic device should be selected for viewing by the user A. For example, the server 200 may choose the electronic devices 100B or 100C by determining which electronic device in the image is turned on according to the metadata MD2 and MD3. When only one of the electronic devices 100B and 100C is turned on, the server 200 may directly determine that the electronic device which is turned on should be chosen. When both of the electronic devices 100B and 100C are turned on, the server 200 may further determine whether the image capturing units of the electronic devices 100B and 100C are activated, respectively. Generally, a user may only use one mobile device to capture image at the same time. Accordingly, the server 200 may determine the electronic device (e.g. 100B or 100C) with the activated image capturing unit for performing interaction. Last, since the user B has registered both the electronic devices 100B and 100C on the server 200, the server 200 may recognize that the user B has two registered electronic devices and illustrate corresponding icons of the electronic devices 100B and 100C on the mobile device 100A. Thus, the user A may select the electronic device 100B or 100C on the screen of the mobile device 100A for performing interaction.

In another embodiment, as illustrated in FIG. 2C, the user A not only selects the image of the electronic device 100B of the user B on the mobile device 100A, but also alternatively selects other registered fixed electronic devices 250 (i.e. not user B registered fixed electronic devices) on the screen of the mobile device 100A. For example, the electronic device 250 may be a projector, a TV or a speaker with network accessing function. Specifically, the images captured by the mobile device 100A of the user A may comprise the user B, the electronic device 100B and/or the electronic device 250. The server 200 may recognize the user B, the electronic device 100B, and the electronic device 250 from the images captured by the mobile device 100A according to the stored recognition data in the database 220 of the server 200. Therefore, the user A may select the user B, the electronic device 100B or the electronic device 250 on the screen of the mobile device 100A, and then display the images captured by the electronic device 100B of the user B on the electronic device 250.

Figure 3A:
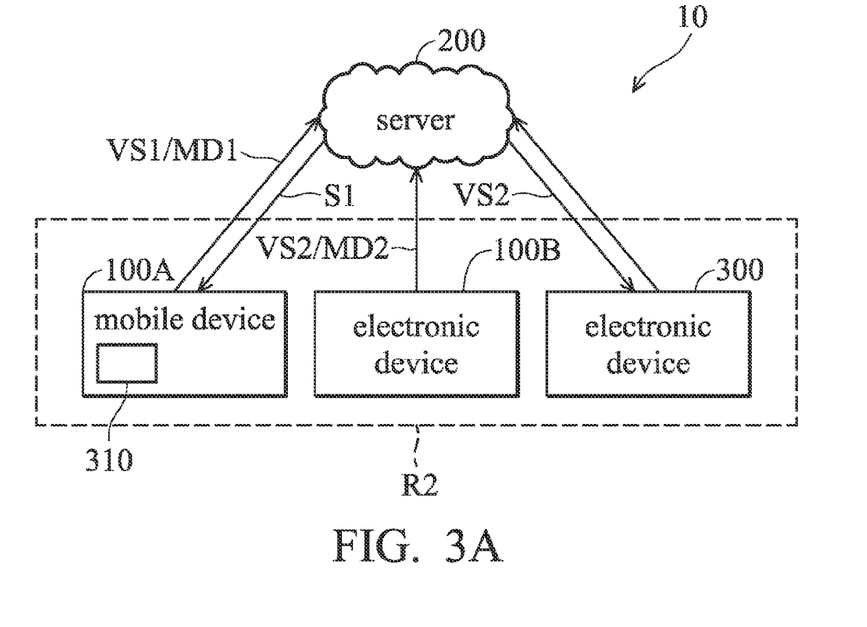
FIGS. 3A to 3B illustrate diagrams of the interaction system according to another embodiment of the invention.
Figure 3B:
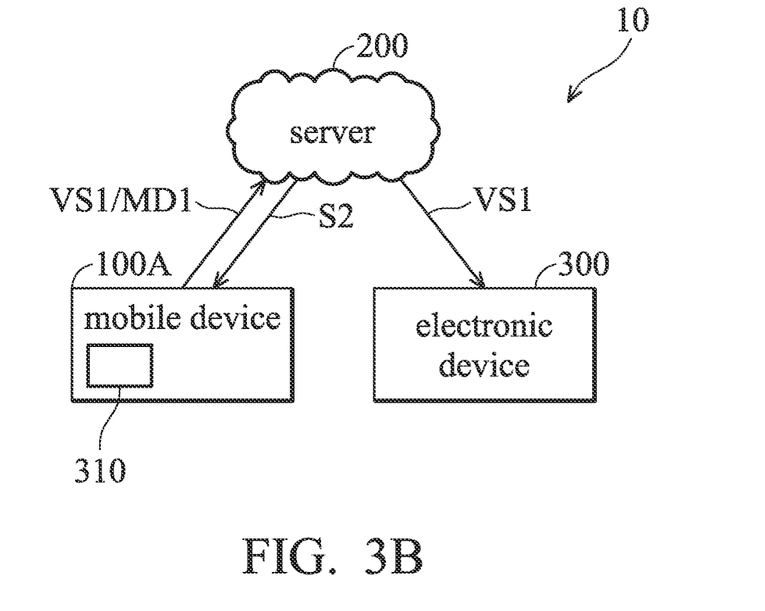

FIGS. 3A to 3B illustrate diagrams of the interaction system according to another embodiment of the invention. The difference between the embodiment of FIG. 3A and FIGS. 2B-2C is that the user may control a registered fixed electronic device 300 (e.g. a TV) which is not in the images captured by the mobile device 100A, if the geographical information of the electronic device 300 has been registered on the server 200. When the Users A and B interact with each other via the mobile device 100A and the electronic device 100B, respectively, the server 200 may further determine whether any other registered electronic device (e.g. electronic device 300) exists in the same area R2 (e.g. within a distance of 10 or 20 m) where the mobile device 100A and the electronic device 100B are located. If so, the server 200 may transmit a notification signal S1 to the mobile device 100A for illustrating a thumbnail picture 310 of the electronic device 300 on the screen of the mobile device 100A. Then, the user A may select the thumbnail picture 310 on the screen of the mobile device 100A, thereby displaying the images captured by the electronic device 100B (i.e. the video stream VS2) on the electronic device 300. In other words, the user A may use an electronic device with a larger screen to view the video stream VS2.

In another embodiment, as illustrated in FIG. 3B, the mobile device 100A may directly interact with the electronic device 300 via the server 200. For example, the server 200 may determine whether the mobile device 100A and the electronic device 300 are in the same area R2 (i.e. within a distance of 10 m or 20 m), wherein the images captured by the mobile device 100 does not comprise the electronic device 300. Then, the server 200 may transmit a notification signal S2 to the mobile device 100A for illustrating the thumbnail picture 310 of the electronic device 300 on the screen of the mobile device 100A. The user A may select the thumbnail picture 310 on the screen of the mobile device 100A, thereby displaying the images captured by the mobile device 100A (i.e. the video stream VS1) on the electronic device 300.

Figure 4:
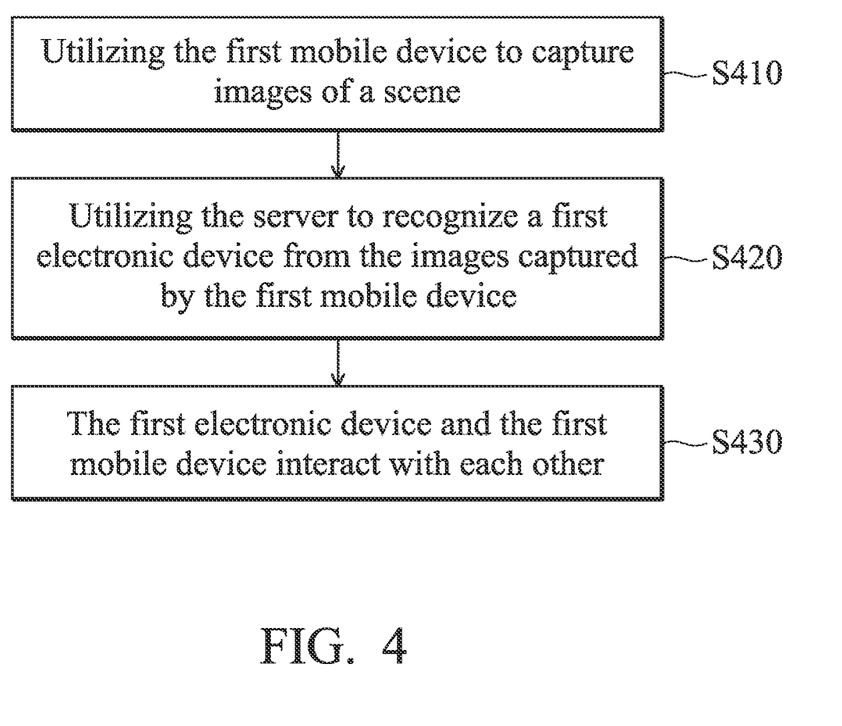
FIG. 4 illustrates a flow chart of the interaction method according to an embodiment of the invention.

FIG. 4 illustrates a flow chart of the interaction method according to an embodiment of the invention. Referring to both FIG. 1A and FIG. 4, in step S410, the mobile device 100A is configured to capture images of a scene. In step S420, the server 200 may recognize the electronic device 100B from the images captured by mobile device 100A. In step S430, the mobile device 100A and the electronic device 100B start to interact with each other. For example, the user A may select the electronic device 100B on the screen of the mobile device 100A, thereby displaying the video stream from the electronic device 100B on the mobile device 100A. It is noted that the electronic device 100B may be devices of different types, such as a mobile device, a display device or a camera, and there are various ways in which the different type of devices may interact with the mobile device 100A. No matter which type of electronic device is used, the registration data, the recognition data and the metadata should be uploaded to the server 200 for recognition and determination. For details on the operation process, reference may be made to the aforementioned embodiments.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An interaction system, comprising:
    a first mobile device, configured to capture images of a scene; and
    a server, configured to recognize a first electronic device from the images captured by the first mobile device, so that the first electronic device and the first mobile device interact with each other,
    wherein a first user selects the first electronic device from the images of the scene, and the server recognizes the first electronic device, retrieves a first video stream captured by the first electronic device and transmits the first video stream to the first mobile device,
    wherein the images of the scene further comprises a second user operating the first electronic device, and when the first user selects the second user from the images of the scene, the server recognizes the second user from the images of the scene by a face recognition technique, and the server further recognize the first electronic device of the second user by registration data of the second user, thereby retrieving the first video stream,
    wherein the images of the scene further comprises a second electronic device of the second user, and the server selects one of the first electronic device and the second electronic device according to first metadata of the first electronic device and second metadata of the second electronic device before the server performs the face recognition technique.

2. The interaction system as claimed in claim 1, wherein the server recognizes the first electronic device by an image recognition technique, a text recognition technique or bar codes of the first electronic device.

* * * * *